US012578021B2

(12) United States Patent (10) Patent No.: US 12,578,021 B2
Shakudo et al. (45) Date of Patent: Mar. 17, 2026

(54) FLOW RATE CONTROL VALVE, MANUFACTURING METHOD OF FLOW RATE CONTROL VALVE, AND FLOW RATE CONTROL APPARATUS

(71) Applicant: HORIBA STEC, Co., Ltd., Kyoto (JP)

(72) Inventors: Kazuya Shakudo, Kyoto (JP);
Shigeyuki Hayashi, Kyoto (JP);
Masayuki Nagasawa, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 18/723,382

(22) PCT Filed: Oct. 20, 2022

(86) PCT No.: PCT/JP2022/039109
§ 371 (c)(1),
(2) Date: Jun. 21, 2024

(87) PCT Pub. No.: WO2023/119828
PCT Pub. Date: Jun. 29, 2023

(65) Prior Publication Data
US 2025/0067347 A1 Feb. 27, 2025

(30) Foreign Application Priority Data
Dec. 24, 2021 (JP) ................................. 2021-210178

(51) Int. Cl.
*F16K 1/36* (2006.01)
*F16K 1/42* (2006.01)
(Continued)

(52) U.S. Cl.
CPC .................. *F16K 1/36* (2013.01); *F16K 1/42* (2013.01); *F16K 7/12* (2013.01); *F16K 7/14* (2013.01);
(Continued)

(58) Field of Classification Search
CPC .......... F16K 1/36; F16K 27/0236; F16K 1/42; F16K 7/14; F16K 7/16; F16K 7/17;
(Continued)

(56) References Cited

U.S. PATENT DOCUMENTS 5,145,147 A * 9/1992 Nakazawa ............ F16K 31/007
251/337
10,941,867 B2 * 3/2021 Vu ............................ F16K 1/42
(Continued)

FOREIGN PATENT DOCUMENTS

CN 203282329 U 11/2013
EP 0973080 A2 1/2000
(Continued)

OTHER PUBLICATIONS

ISA Japan Patent Office, International Search Report Issued in Application No. PCT/JP2022/039109, Jan. 17, 2023, WIPO, 4 pages.

*Primary Examiner* — Marina A Tietjen
(74) *Attorney, Agent, or Firm* — Alleman Hall LLP

(57) ABSTRACT

A flow rate control valve includes a valve seat portion, a valve member, a driving portion, and a support member supporting the valve member via a diaphragm portion. The valve member has an opposite face opposite from a valve seat face with respect to a seat face and a circumferential face connecting together the seat face and the opposite face. The diaphragm portion is connected to the circumferential face of the valve member at a position closer to the seat face than to the opposite face. The support member has a first face on the same side as the opposite face with respect to a membrane face of the diaphragm portion and a second face closer to the valve seat portion than the first face. When the diaphragm portion is not deformed, the opposite face and the first face are on the same plane.

21 Claims, 11 Drawing Sheets

(51) Int. Cl.

| | | |
|---|---|---|
| *F16K 7/12* | (2006.01) | |
| *F16K 7/14* | (2006.01) | |
| *F16K 7/16* | (2006.01) | |
| *F16K 7/17* | (2006.01) | |
| *F16K 27/02* | (2006.01) | |
| *F16K 37/00* | (2006.01) | |

(52) U.S. Cl.
CPC .................. *F16K 7/16* (2013.01); *F16K 7/17* (2013.01); *F16K 27/0236* (2013.01); *F16K 37/00* (2013.01)

(58) Field of Classification Search
CPC . F16K 7/12; F16K 37/00; F16K 31/02; F16K 37/005; F16K 41/10; F16K 41/103; F16K 41/12

See application file for complete search history.

(56) References Cited

U.S. PATENT DOCUMENTS

| | | | |
|---|---|---|---|
| 2010/0243076 A1 | 9/2010 | Hayashi | |
| 2016/0369915 A1* | 12/2016 | Vu ............................ | F16K 7/14 |
| 2018/0003312 A1* | 1/2018 | Schupp ................ | F16K 31/004 |
| 2021/0381606 A1* | 12/2021 | Fischer ................ | F16K 31/007 |

FOREIGN PATENT DOCUMENTS

| | | | |
|---|---|---|---|
| EP | 0973080 | B1 | 6/2004 |
| JP | H067240 | Y2 | 2/1994 |
| JP | 2000035821 | A | 2/2000 |
| JP | 2010230159 | A | 10/2010 |
| JP | 2011214713 | A | 10/2011 |

* cited by examiner

DRIVING
CONTROL
PORTION

CALCULATION
PORTION

CA (WHEN A < 4T)

(WHEN A ≥ 4T)

$L < N < M$

FLOW RATE CONTROL VALVE, MANUFACTURING METHOD OF FLOW RATE CONTROL VALVE, AND FLOW RATE CONTROL APPARATUS

TECHNICAL FIELD

The present invention relates to a flow rate control valve, a method of manufacturing a flow rate control valve, and a flow rate control apparatus incorporating such a flow rate control valve.

BACKGROUND ART

Conventionally, various types of flow rate control apparatuses such as mass flow controllers have been devised (see, for example, Patent Document 1).

CITATION LIST

Patent Literature

Patent Document 1: Japanese Patent Application published as No. 2010-230159.

SUMMARY OF INVENTION

Technical Problem

For example, in flow rate control apparatuses, the flow rate of a fluid such as a gas is controlled by a flow rate control valve including an actuator. That is, when the actuator is driven so that a seat face of a valve member moves away from a valve seat face of a valve seat portion, a fluid flows through an opening provided in the valve seat face. By contrast, when the seat face seats on the valve seat face, the opening provided in the valve seat face is closed by the seat face, and thus the fluid ceases to flow through the opening.

With the seat face seated, sealing performance between the valve seat face and the seat face is important to reduce the flow rate of a fluid to zero (or close to zero). Conventional flow rate control valves leave room for improvement in terms of sealing performance.

The present invention is devised to solve the above problem and aims to provide a flow rate control valve that can improve sealing performance between the valve seat face and the seat face, a method of manufacturing such a flow rate control valve, and a flow rate control apparatus incorporating such a flow rate control valve.

Solution to Problem

According to one aspect of the present invention, a flow rate control valve includes: a valve seat portion having a valve seat face; a valve member having a seat face that makes contact with and separates from the valve seat face; a driving portion that drives the valve member in a contact/separate direction in which the seat face makes contact with and separates from the valve seat face; and a support member that supports the valve member via a diaphragm portion. The valve member further has an opposite face that is positioned opposite from the valve seat face with respect to the seat face and a circumferential face that connects together the seat face and the opposite face. The diaphragm portion is connected to the circumferential face of the valve member at a position closer to the seat face than to the opposite face. The support member has a first face that is positioned on the same side as the opposite face with respect to the position of a membrane face of the diaphragm portion and a second face that is positioned closer to the valve seat portion than the first face. When the diaphragm portion is in an undeformed state, the opposite face and the first face are positioned on the same plane.

According to another aspect of the present invention, a flow rate control valve includes: a valve seat portion having a valve seat face; a valve member having a seat face that makes contact with and separates from the valve seat face; a driving portion that drives the valve member in a contact/separate direction in which the seat face makes contact with and separates from the valve seat face; and a support member that supports the valve member via a diaphragm portion. The valve member further has an opposite face that is positioned opposite from the valve seat face with respect to the seat face and a circumferential face that connects together the seat face and the opposite face. The diaphragm portion is connected to the circumferential face of the valve member at a position closer to the seat face than to the opposite face. The support member has a first face that is positioned on the same side as the opposite face with respect to the position of a membrane face of the diaphragm portion and a second face that is positioned closer to the valve seat portion than the first face. The height of the valve member, which is defined as the distance between the opposite face and the seat face, is equal to the height of the support member, which is defined as the distance between the first face and the second face.

According to yet another aspect of the present invention, a method of manufacturing the flow rate control valve described above includes a polishing process of polishing the seat face by pressing the seat face of the valve member against a lapping surface plate with a polishing material in between. In the polishing process, the seat face is polished with the opposite face of the valve member and the first face of the support member simultaneously pressed with the same flat face against the lapping surface plate.

According to yet another aspect of the present invention, a flow rate control valve includes: a valve seat portion having a valve seat face; a valve member having a seat face that makes contact with and separates from the valve seat face; a driving portion that drives the valve member in a contact/separate direction in which the seat face makes contact with and separates from the valve seat face; and a support member that supports the valve member via a diaphragm portion. The valve member further has an opposite face that is positioned opposite from the valve seat face with respect to the seat face and a circumferential face that connects together the seat face and the opposite face. The diaphragm portion is connected to the circumferential face of the valve member at a position between the opposite face and the seat face. The support member has a first face that is positioned on the same side as the opposite face with respect to a position of a membrane face of the diaphragm portion and a second face that is positioned opposite from the first face with respect to the position of the membrane face of the diaphragm portion. When the thickness of the diaphragm portion in the contact/separate direction is T, the diaphragm portion is positioned at least 4T away from the seat face in the contact/separate direction.

According to yet another aspect of the present invention, a flow rate control valve includes: a valve seat portion having a valve seat face; a valve member having a seat face that makes contact with and separates from the valve seat face; a driving portion that drives the valve member in a contact/separate direction in which the seat face makes contact with and separates from the valve seat face; and a support member that supports the valve member via a diaphragm portion. The valve member further has an opposite face that is positioned opposite from the valve seat face with respect to the seat face and a circumferential face that connects together the seat face and the opposite face. The diaphragm portion is connected to the circumferential face of the valve member at a position between the opposite face and the seat face. The support member has a first face that is positioned on the same side as the opposite face with respect to a position of a membrane face of the diaphragm portion and a second face that is positioned opposite from the first face with respect to the position of the membrane face of the diaphragm portion. The outer diameter of the seat face is larger than the inner diameter of the diaphragm portion.

According to yet another aspect of the present invention, a flow rate control apparatus includes: any of the flow rate control valves described above; a flow rate sensing mechanism that senses the flow rate of a fluid; and a driving control portion that drives the driving portion of the flow rate control valve based on the sensing result from the flow rate sensing mechanism.

Advantageous Effects of Invention

According to the present invention, it is possible to improve sealing performance between the valve seat face and the seat face.

DESCRIPTION OF EMBODIMENTS

An illustrative embodiment of the present invention will be described below with reference to the accompanying drawings.

1. Outline of a Flow Rate Control Apparatus

Figure 1:
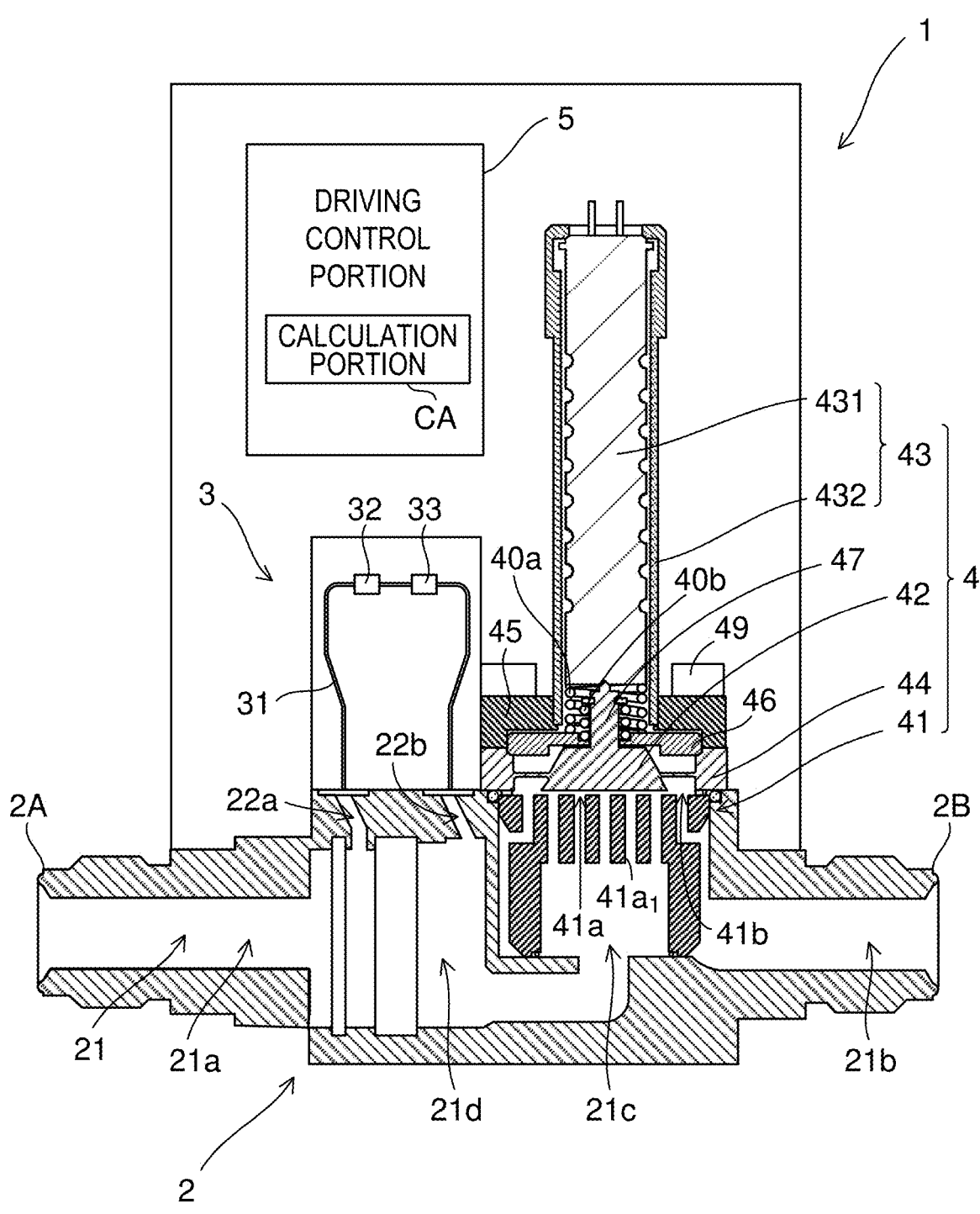
FIG. 1 is a diagram illustrating the structure of a flow rate control apparatus according to one embodiment of the present invention.

FIG. 1 is a diagram illustrating an outline of the structure of a flow rate control apparatus 1 according to an embodiment. The flow rate control apparatus 1 is configured with, for example, a mass flow controller. The mass flow controller is a device used, for example, in semiconductor manufacturing equipment to control the flow rate of a fluid such as a gas in a semiconductor manufacturing process. The flow rate control apparatus 1 includes a main body portion 2, a flow rate sensing mechanism 3, a flow rate control valve 4, and a driving control portion 5.

The main body portion 2 is a block having a flow passage 21 inside it. The fluid mentioned above flows through the flow passage 21. The flow passage 21 includes an inlet passage 21a positioned upstream, an outlet passage 21b positioned downstream, and an intermediate flow passage 21c positioned between the inlet passage 21a and the outlet passage 21b. In the intermediate flow passage 21c, a valve seat portion 41, described later, is positioned.

At the upstream end of the flow passage 21 (in particular, the inlet passage 21a), an upstream port 2A is positioned. The upstream port 2A is connected to an external inlet pipe (not shown). At the downstream end of the flow passage 21 (in particular, the outlet passage 21b), a downstream port 2B is positioned. The downstream port 2B is connected to an external outlet pipe (not shown).

The inlet passage 21a connects to the intermediate flow passage 21c via a bypass portion 21d. The bypass portion 21d connects to an entrance passage 22a and an exit passage 22b. The entrance passage 22a and the exit passage 22b connect to one end and the other end, respectively, of a narrow pipe 31 in a flow rate sensing mechanism 3.

Thus, the fluid entering the inlet passage 21a via the upstream port 2A from the external inlet pipe flows in a form divided between the entrance passage 22a and the bypass portion 21d in a predetermined flow rate ratio. The fluid that flows via the entrance passage 22a through the narrow pipe 31 of the flow rate sensing mechanism 3 is directed via the exit passage 22b to the bypass portion 21d and joins the fluid flowing through the bypass portion 21d. The joined fluid flows from the bypass portion 21d towards the intermediate flow passage 21c.

The flow rate sensing mechanism 3 senses the flow rate of the fluid flowing through the flow passage 21 (in particular, the inlet passage 21a). In this embodiment, the flow rate sensing mechanism 3 is configured to employ a thermal method to sense the flow rate of the fluid. Specifically, the flow rate sensing mechanism 3 includes the narrow pipe 31 described above and a pair of heating resistance wires 32 and 33. The heating resistance wires 32 and 33 are wound around the narrow pipe 31 and are each connected to a bridge circuit (not shown). Passing a current through the heating resistance wires 32 and 33 and passing the fluid through the narrow pipe 31 while heating the heating resistance wires 32 and 33 produces a temperature difference corresponding to the mass flow rate of the fluid between upstream and downstream parts of the narrow pipe 31. Converting this temperature difference into an electrical signal using the bridge circuit mentioned above permits measurement (sensing) of the mass flow rate of the fluid. A calculation portion CA, including the bridge circuit, for measuring the mass flow rate may be included in, for example, the driving control portion 5, which will be described later.

The flow rate sensing mechanism 3 may be configured to sense the flow rate of the fluid using a method other than the thermal method (for example, a pressure method (pressure difference method)).

The flow rate control valve 4 is a mechanism that controls the flow rate of the fluid flowing through the flow passage 21 and is configured, for example, as a normally open type. Such a flow rate control valve 4 is configured to include the valve seat portion 41, a valve member 42, an actuator 43, a support member 44, a retaining member 45, and a movement restriction member 46.

Figure 2:
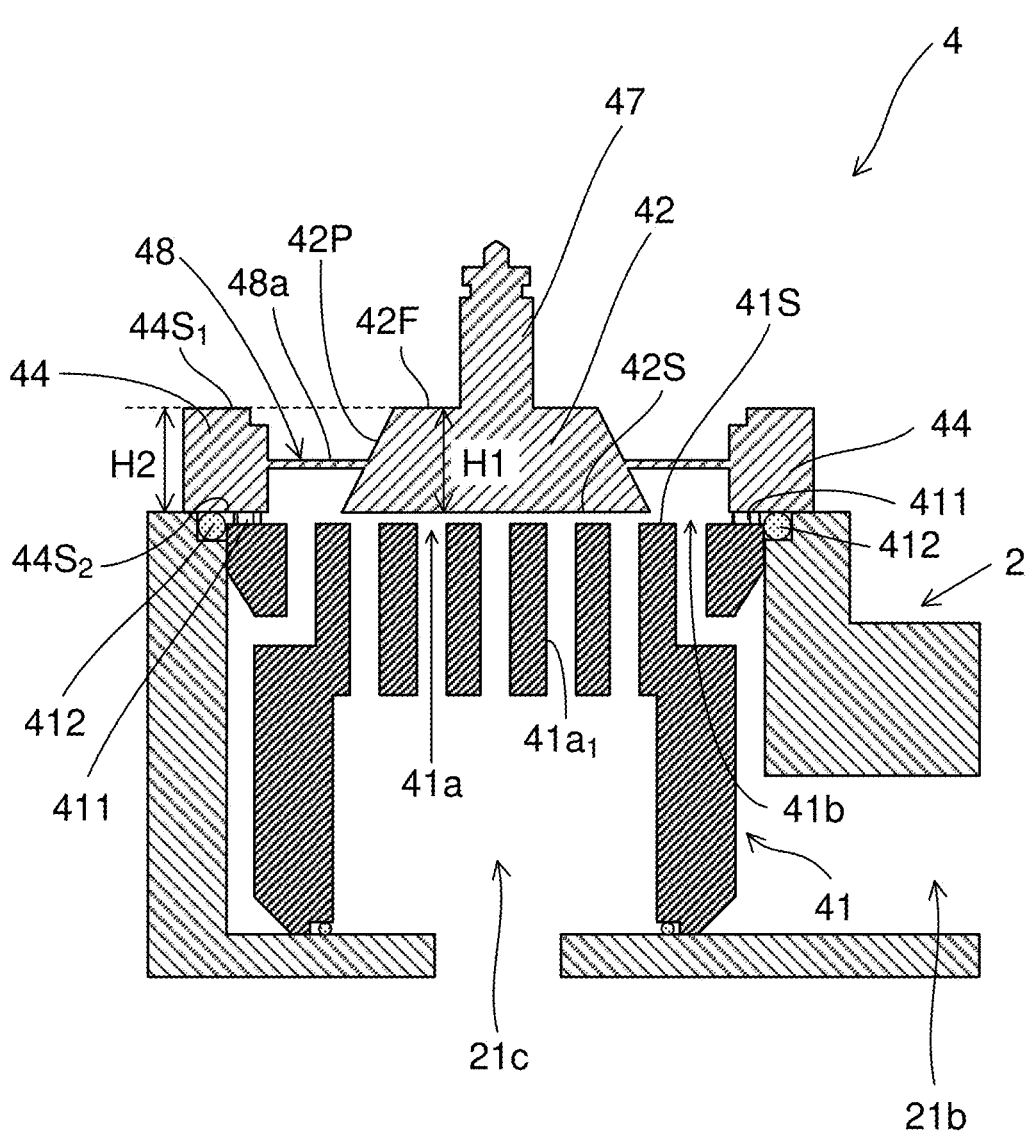
FIG. 2 is a sectional view showing, on an enlarged scale, a principal portion of a flow rate control valve included in the flow rate control apparatus.

FIG. 2 is a sectional view showing, on an enlarged scale, a principal portion of the flow rate control valve 4. The valve seat portion 41 of the flow rate control valve 4 is a block that includes a valve seat face 41S. The valve seat face 41S has first openings 41*a* and second openings 41*b* formed in it. The first openings 41*a* communicate with the intermediate flow passage 21*c*, which is the fluid inlet passage, via a communication passage 41*a*1. The second openings 41*b* communicate with the outlet passage 21*b*. In this embodiment, although a plurality of first openings 41*a* are formed in the valve seat face 41S, the number of first opening 41*a* may be one. Similarly, although a plurality of second openings 41*b* are formed in the valve seat face 41S, the number of second opening 41*b* may be one.

The valve member 42 is a truncated cone-shaped moving member that makes contact with the actuator 43 (in particular, a piezo stack 431, see FIG. 1) via a plunger 47. The valve member 42 has a seat face 42S. The seat face 42S is a face that moves into and out of contact (makes contact with or separates from) the valve seat face 41S of the valve seat portion 41.

The valve member 42 further has an opposite face 42F. The opposite face 42F is positioned opposite from the valve seat face 41S with respect to the seat face 42S. In particular, in this embodiment, the opposite face 42F is positioned opposite from the seat face 42S with respect to the position of a membrane face 48*a* of a diaphragm portion 48. In other words, the seat face 42S described above is positioned opposite from the opposite face 42F with respect to the position of the membrane face 48*a*. Thus, in the direction in which the seat face 42S moves into and out of contact with the valve seat face 41S (hereinafter also called a contact/separate direction), the membrane face 48*a* of the diaphragm portion 48 is positioned between the seat face 42S and the opposite face 42F.

Here, the diaphragm portion 48 is an annular thin film extending in a direction intersecting with the contact/separate direction described above. The membrane face 48*a* of the diaphragm portion 48 refers to the surface of the membrane of the diaphragm portion 48. Since the valve member 42 is in a truncated cone shape as described above, the seat face 42S has a larger diameter than the opposite face 42F. The plunger 47 described above is connected to the valve member 42 at the center of the opposite face 42F.

The valve member 42 further has a circumferential face 42P. The circumferential face 42P is a face that connects together the seat face 42S and the opposite face 42F of the valve member 42. That is, the circumferential face 42P intersects with both the seat face 42S and the opposite face

42F. The diaphragm portion 48 described above is connected to the circumferential face 42P of the valve member 42 at a position closer to the seat face 42S than to the opposite face 42F. Specifically, the diaphragm portion 48 is connected to the circumferential face P at a position between the opposite face 42F and the seat face 42S.

The actuator 43 is a driving portion that drives the valve member 42 in the contact/separate direction described above via the plunger 47. As shown in FIG. 1, the actuator 43 includes, for example, the piezo stack 431. The piezo stack 431 is formed by stacking together a plurality of piezoelectric elements that deform by expansion under application of a voltage. The piezo stack 431 is housed in a housing 432 and applies a pressure to the plunger 47 of the valve member 42.

The support member 44 is positioned around the valve member 42 and is a frame member that supports the valve member 42 via the diaphragm portion 48. The support member 44 has a first face $44S_1$ and a second face $44S_2$. The first face $44S_1$ is positioned on the same side as the opposite face 42F with respect to the position of the membrane face 48*a* of the diaphragm portion 48. The second face $44S_2$ is positioned closer to the valve seat portion 41 than the first face $44S_1$. In particular, in this embodiment, the second face $44S_2$ is positioned on the opposite side from the first face $44S_1$ with respect to the position of the membrane face 48*a* of the diaphragm portion 48. Thus, the membrane face 48*a* of the diaphragm portion 48 is positioned between the first face $44S_1$ and the second face $44S_2$ of the support member 44 in the contact/separate direction described above. The first face $44S_1$ of the support member 44 is the face farthest away from the second face $44S_2$ in the contact/separate direction.

A shim 411 is provided between the second face $44S_2$ and the valve seat face 41S. This forms a gap corresponding to the thickness of the shim 411 between the seat face 42S and the valve seat face 41S. The support member 44 described above is provided on top of the main body portion 2 via an O-ring 412.

As shown in FIG. 1, the retaining member 45 is a cover that presses the support member 44 against the main body portion 2 and holds the movement restriction member 46 between itself and the support member 44. The support member 44, together with the retaining member 45, is fixed to the main body portion 2 with a fastening member 49 such as a bolt.

The movement restriction member 46 is a member that restricts the movement of the valve member 42 in such a direction (hereinafter, also called a first direction) that the seat face 42S moves away from the valve seat face 41S, and has a through hole at the center. The plunger 47 is inserted through the through hole. When the valve member 42 moves in the first direction, the opposite face 42F of the valve member 42 makes contact with the movement restriction member 46, and this restricts the movement of the valve member 42 in the first direction.

In FIG. 1, one end of a first urging member 40*a*, such as a spring, is fixed to the piezo stack 431 in the actuator 43, on its face in contact with the plunger 47. The first urging member 40*a* is positioned around the plunger 47. The other end of the first urging member 40*a* is fixed to the movement restriction member 46.

Inside the first urging member 40*a*, that is, between the first urging member 40*a* and the plunger 47, a second urging member 40*b*, such as a spring, is positioned. One end of the second urging member 40*b* is fixed to the plunger 47 via a stopping member. The other end of the second urging member 40*b* is fixed to the movement restriction member 46.

In the structure described above, when no voltage is applied to the piezo stack 431, the valve opening degree, that is, the gap between the seat face 42S and the valve seat face 41S, is set to a predetermined value. A state where the valve opening degree is at the predetermined value corresponds to the fully open state of the flow rate control valve 4. In this state, under the urging force of the second urging member 40*b* shown in FIG. 1, the valve member 42 is lifted in the first direction together with the plunger 47. As a result of this movement of the valve member 42 relative to the support member 44 in the first direction, the diaphragm portion 48 deforms such that the part of it connected to the valve member 42 is displaced in the first direction relative to the part of it connected to the support member 44.

When a voltage is applied to the piezo stack 431, the piezo stack 431 extends. As a result, the piezo stack 431, against the urging forces of the first urging member 40*a* and the second urging member 40*b*, pushes the valve member 42 in the direction (hereinafter, also called a second direction) opposite to the first direction via the plunger 47. Eventually, the seat face 42S of the valve member 42 seats on (makes contact with) the valve seat face 41S of the valve seat portion 41. With the seat face 42S seating on the valve seat face 41S, the diaphragm portion 48 is pulled and deformed due to the movement of the valve member 42 in the second direction. Here, as the valve member 42 moves in the second direction, for example (ideally), the diaphragm portion 48 deforms, via the undeformed state shown in FIG. 2, such that the part of it connected to the valve member 42 is displaced in the second direction relative to the part of it connected to the support member 44.

With the diaphragm portion 48 in the undeformed state, the membrane face 48*a* of the diaphragm portion 48 is positioned along a face (for example, the valve seat face 41S) perpendicular to the contact/separate direction (the movement direction of the valve member 42). This state is the same as that of the diaphragm portion 48 before being built into the flow rate control valve 4 (flow rate control apparatus 1) in a form integrated together with the valve member 42 including the plunger 47, the support member 44, and the diaphragm portion 48.

The actuator 43 (piezo stack 431) is in contact with the plunger 47 at a single point. The urging force applied to the valve member 42 via the plunger 47 by the second urging member 40*b* is not uniform in the circumferential direction about a center axis along the contact/separate direction. Thus, even when the valve member 42 moves in the contact/separate direction, the diaphragm portion 48 may not come into the undeformed state. In other words, even when a voltage that should bring the diaphragm portion 48 into the undeformed state is applied to the actuator 43, the diaphragm portion 48 may, instead of coming into the undeformed state (horizontal state), remain inclined relative to a horizontal plane.

As described above, as the actuator 43 (in particular, the piezo stack 431) is driven, the seat face 42S of the valve member 42 makes contact with and separates from the valve seat face 41S of the valve seat portion 41. By applying a voltage (opening degree control signal) corresponding to the desired valve opening degree to the actuator 43 and extending the actuator 43 (piezo stack 431), it is possible to achieve the valve opening degree corresponding to the value of the opening degree control signal and to adjust (control) the flow rate of the fluid flowing from the intermediate flow passage 21*c* to the outlet passage 21*b* via the first opening 41*a*, the gap described above, and the second opening 41*b*.

The driving control portion 5 feeds the opening degree control signal described above to the actuator 43 in the flow rate control valve 4 based on the sensing result (sensed flow rate) from the flow rate sensing mechanism 3 to drive the actuator 43. The driving control portion 5 is configured to include: (1) an amplifier circuit that amplifies the output signal of the bridge circuit described above, (2) a correction circuit that corrects the output signal of the amplifier circuit to output the result to outside the flow rate control apparatus 1, (3) a comparison control circuit that compares the corrected signal with a flow rate setting signal input from outside, (4) a driving circuit that generates a driving signal (opening degree control signal) for the actuator 43 based on the output of the comparison control circuit, a control portion (e.g., a CPU), and the like. The driving control portion 5 driving the actuator 43 makes it possible to adjust the valve opening degree as described above and bring the flow rate of the fluid flowing through the flow passage 21 (in particular, the outlet passage 21*b*) closer to a prescribed set flow rate.

2. Positional Relationship Between the Opposite Face of the Valve Member and the First Face of the Support Member In this embodiment, when the diaphragm portion 48 is in the undeformed state (the state in FIG. 2), the opposite face 42F of the valve member 42 and the first face 44S$_1$ of the support member 44 are positioned on the same plane.

With the seat face 42S seating on the valve seat face 41S, poor sealing performance between the seat face 42S and the valve seat face 41S causes a fluid leak between the seat face 42S and the valve seat face 41S. To avoid this, for example, applying a resin coating to the seat face 42S is effective for satisfactory sealing performance. However, irregularities on the surface of the thin film formed as the resin coating impairs sealing performance, and thus the surface of the thin film formed as the resin coating needs to have a high degree of flatness. To achieve a high degree of flatness, the surface of the thin film needs to be polished (lapped). For the resin material for coating, fluororesin such as PFA (perfluoro-alkoxyalkane) can be used. Hereinafter, the surface of the thin film coating the seat face 42S will be called the seat face 42S in contact with the valve seat face 41S.

If the valve member 42 inclines during the lapping of the seat face 42S, when the flow rate control apparatus 1 is assembled using the valve member 42, it is difficult to keep the seat face 42S parallel to the valve seat face 41S. As a result, the seat face 42S cannot make close contact with the valve seat face 41S, and this causes a fluid leak. Such inclination of the valve member 42 during lapping results, for example, when only the first face 44S$_1$ of the support member 44 is supported during lapping.

Figure 3:
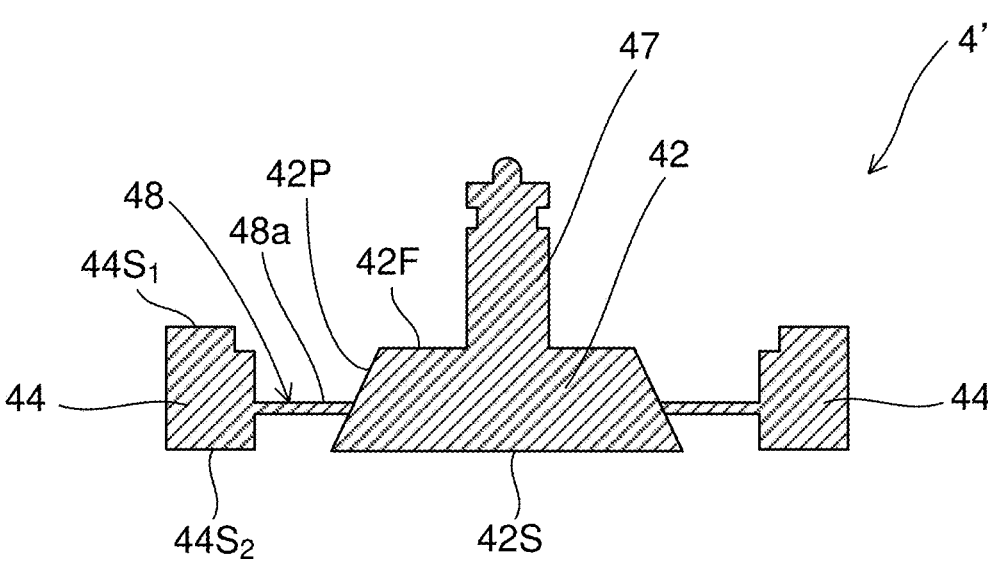
FIG. 3 is a sectional view showing an outline of the structure of a flow rate control valve of a comparative example.
Figure 3:
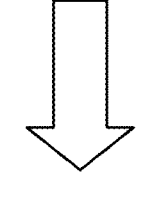
Figure 3:
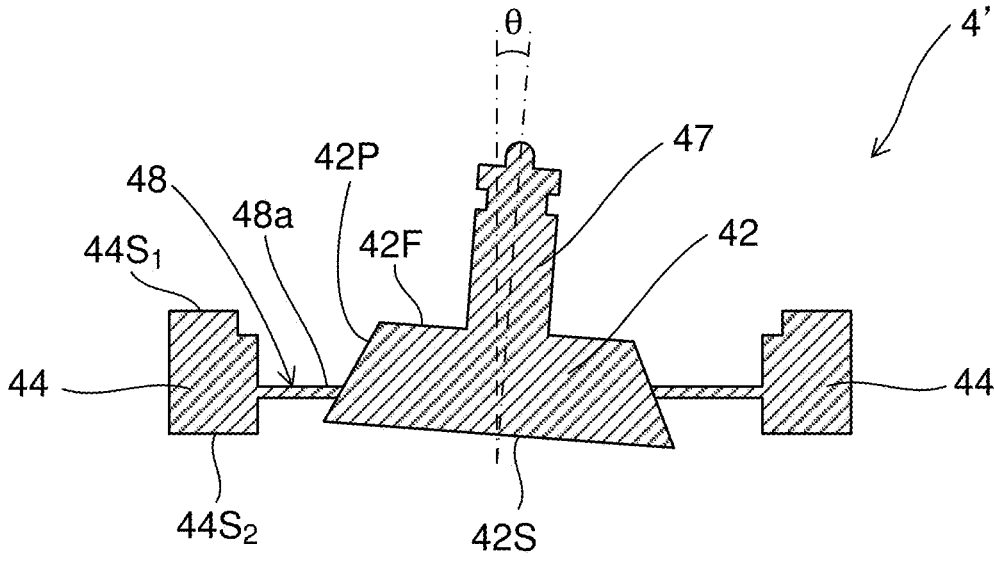

FIG. 3 is a sectional view showing an outline of the structure of a flow rate control valve 4' of a comparative example. The flow rate control valve 4' of the comparative example differs from the flow rate control valve 4 (see FIGS. 1 and 2) of the present embodiment in that, when the diaphragm portion 48 is in the undeformed state, the opposite face 42F of the valve member 42 and the first face 44S$_1$ of the support member 44 are positioned displaced from each other in the contact/separate direction. More particularly, in the flow rate control valve 4' of the comparative example, when the diaphragm portion 48 is in the undeformed state, the opposite face 42F of the valve member 42 is positioned closer to the seat face 42S in the contact/separate direction described above than the first face 44S$_1$ of the support member 44 is.

In such a flow rate control valve 4', when lapping the seat face 42S, it is not possible to simultaneously press the opposite face 42F and the first face 44S$_1$ with a pressing member having a single flat face; thus, it is necessary to lap the seat face 42S, for example, with only the first face 44S$_1$ of the support member 44 pressed. In this case, since the valve member 42 is not supported, during lapping, the valve member 42 is unstable and inclines at an angle θ relative to the contact/separate direction (what is called angular misalignment).

Figure 4:
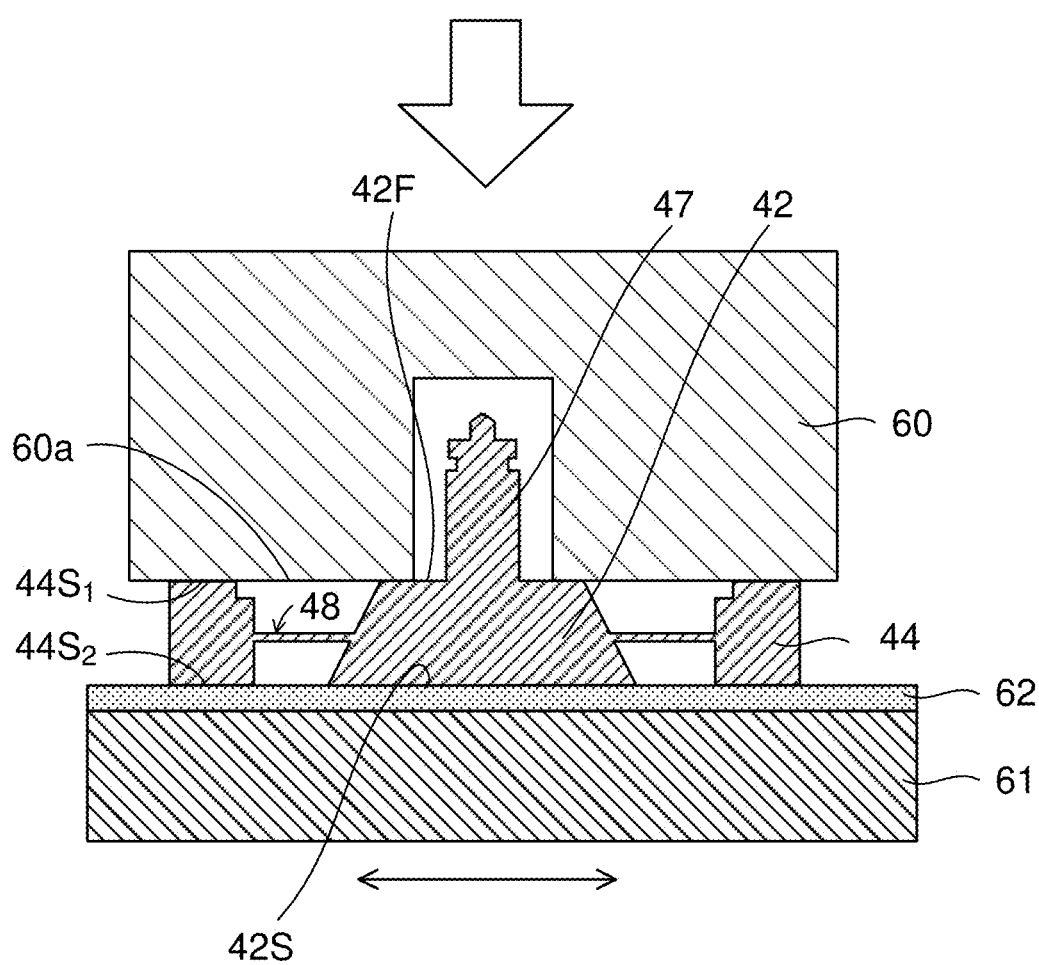
FIG. 4 is a sectional view schematically showing the manufacturing process of the flow rate control valve in FIGS. 1 and 2.

In contrast, the flow rate control valve 4 of this embodiment is constructed such that, when the diaphragm portion 48 is in the undeformed state, the opposite face 42F and the first face 44S$_1$ are positioned on the same plane. With this construction, during the lapping of the seat face 42S before the flow rate control valve 4 is built into the flow rate control apparatus 1, the technique described below can be employed. FIG. 4 is a sectional view schematically showing the manufacturing process of the flow rate control valve 4 of this embodiment. In a polishing (lapping) process, the seat face 42S of the valve member 42 is pressed against a lapping surface plate 61 with a polishing material 62 in between, and the lapping surface plate 61 is rotated or moved relative to the valve member 42 so that the seat face 42S is thereby polished. Here, the seat face 42S is polished with the opposite face 42F of the valve member 42 and the first face 44S$_1$ of the support member 44 simultaneously pressed with the same flat face 60a of the pressing member 60 against the lapping surface plate 61.

With the structure of the flow rate control valve 4 of this embodiment, when lapping the seat face 42S as described above, it is possible to do it by simultaneously pressing the opposite face 42F and the first face 44S$_1$ with a single pressing member 60, that is, with a pressing member 60 having a single (common) flat face 60a. Pressing the opposite face 42F of the valve member 42 helps reduce the risk of the valve member 42 inclining during lapping. Thus, it is possible to keep the seat face 42S and the valve seat face 41S parallel enough. This permits the seat face 42S to seat on the valve seat face 41S reliably in close contact with it and helps improve the sealing performance between the seat face 42S and the valve seat face 41S.

In particular, polishing the seat face 42S while simultaneously pressing the opposite face 42F and the first face 44S$_1$ with the same flat face 60a of the pressing member 60 against the lapping surface plate 61 helps reliably reduce the likelihood of angular misalignment. As a result, it is possible to reliably keep the seat face 42S and the valve seat face 41S parallel and reliably improve sealing performance between the seat face 42S and the valve seat face 41S.

In this embodiment, the seat face 42S of the valve member 42 is positioned opposite from the opposite face 42F with respect to the membrane face 48a of the diaphragm portion 48, and the second face 44S$_2$ of the support member 44 is positioned opposite from the first face 44S$_1$ with respect to the membrane face 48a. In other words, the membrane face 48a of the diaphragm portion 48 is positioned, in the contact/separate direction described above, between the seat face 42S and the opposite face 42F of the valve member 42, between the first face 44S$_1$ and the second face 44S$_2$ of the support member 44. With this structure, the opposite face 42F and the first face 44S$_1$ are spatially away from each other and discontinuous, and the seat face 42S and the second face 44S$_2$ are spatially away from each other and discontinuous. Thus, when the seat face 42S is lapped with only the first face 44S$_1$ pressed, the valve member 42 tends to become highly unstable and is prone to angular misalignment as described above. Thus, the structure of this embodiment with improved sealing performance resulting from the opposite face 42F and the first face 44S$_1$ being positioned on the same plane is highly effective when the opposite face 42F and the first face 44S$_1$ are discontinuous and in addition the seat face 42S and the second face 44S$_2$ are discontinuous.

The seat face 42S and the second face 44S$_2$ may be configured to be continuous across the diaphragm portion 48. That is, the seat face 42S, the second face 44S$_2$, and the diaphragm portion 48 may be configured to be positioned on the same plane. Even with such a structure, it is possible to adopt a construction where, when the diaphragm portion 48 is in the undeformed state, the opposite face 42F and the first face 44S$_1$ are positioned on the same plane, so that the same effect as this embodiment can be achieved.

When lapping both the seat face 42S and the second face 44S$_2$ simultaneously using the method shown in FIG. 4, the height H1 (in the contact/separate direction) of the valve member 42, which is defined as the distance between the opposite face 42F and the seat face 42S, is equal to the height H2 (in the contact/separate direction) of the support member 44, which is defined as the distance between the first face 44S$_1$ and the second face 44S$_2$ (see FIG. 2). Having the height H1 of the valve member 42 equal to the height H2 of the support member 44 permits the seat face 42S to seat on the valve seat face 41S in close contact with it and helps improve the sealing performance between the seat face 42S and the valve seat face 41S. Here, the heights H1 and H2 are assumed to be constant in the direction perpendicular to the contact/separate direction.

In a configuration where, when the diaphragm portion 48 is in the undeformed state, the opposite face 42F and the first face 44S$_1$ are positioned on the same plane, the height H1 of the valve member 42 may be higher than the height H2 of the support member 44. Even in this case, it is possible to lap the seat face 42S by pressing the opposite face 42F and the first face 44S$_1$ simultaneously with the pressing member 60 having a single (common) flat face 60a. In this case, the seat face 42S can be polished mechanically and the second face 44S$_2$ may be polished manually.

Figure 5:
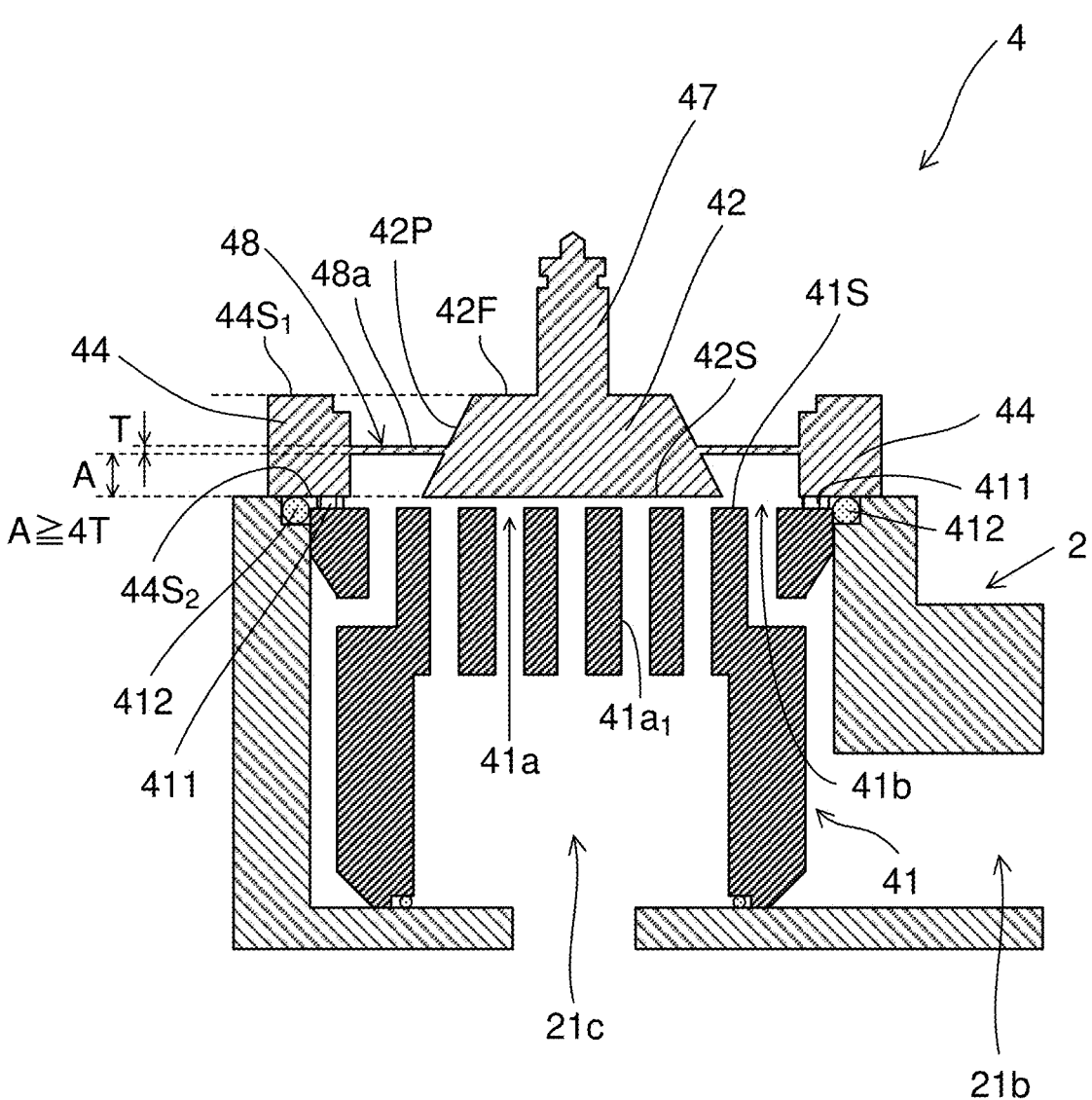
FIG. 5 is a diagram schematically illustrating the relationship, in the flow rate control valve, between the thickness T of a diaphragm portion and the distance A from the seat face of the diaphragm portion.

3. Relationship Between Thickness of the Diaphragm Portion and Distance from the Seat Face FIG. 5 schematically shows, in the flow rate control valve 4 described above, the relationship between the thickness T (mm) of the diaphragm portion 48 in the contact/separate direction described above and the distance A (mm) from the seat face 42S of the diaphragm portion 48. As shown in the same diagram, the flow rate control valve 4 satisfies A≥4T. In other words, the diaphragm portion 48 is positioned at least 4T away from the seat face 42S in the contact/separate direction described above. For example, if T=0.25 mm, then the distance A should be 1 mm or more.

Figure 6:
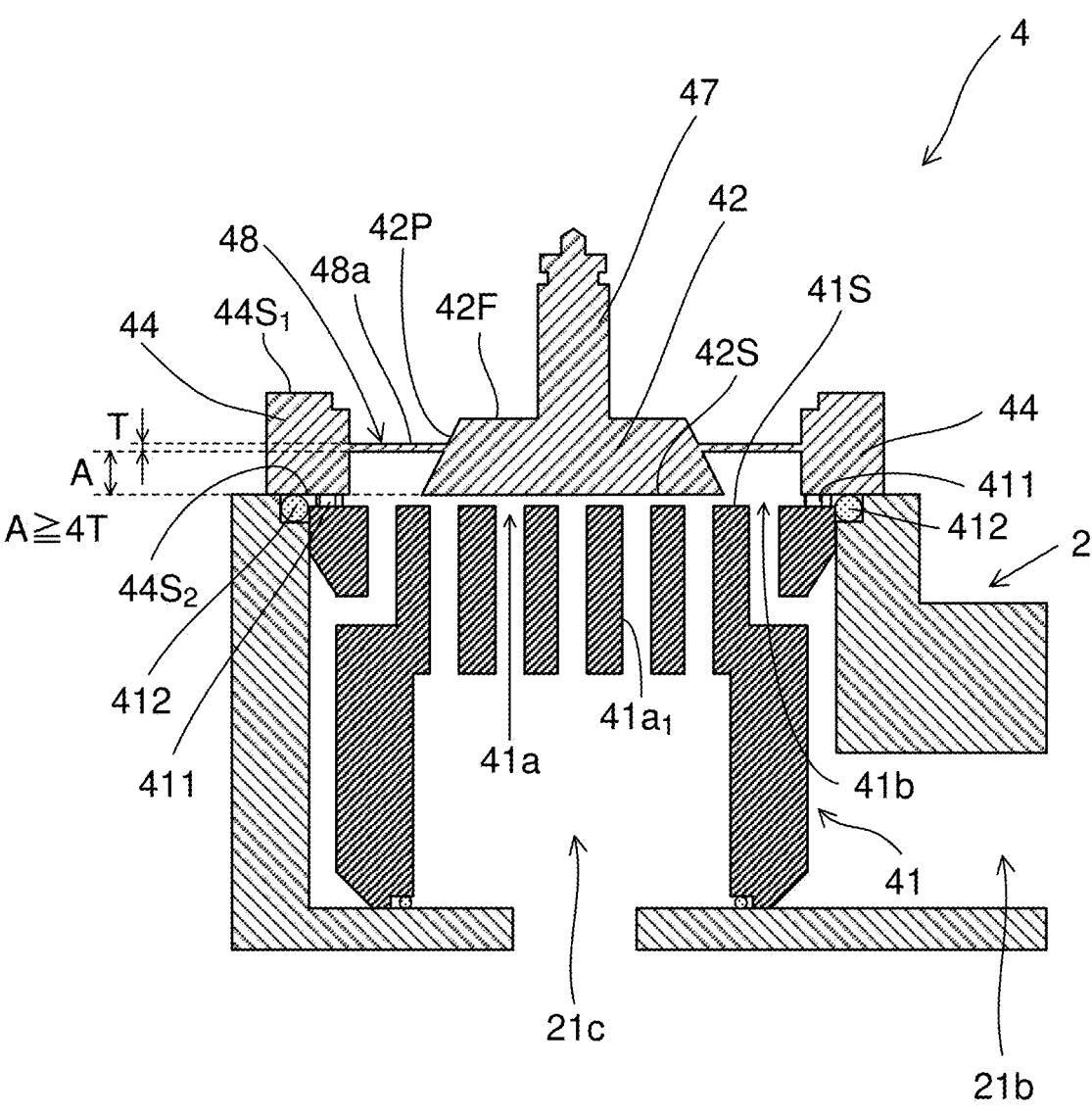
FIG. 6 is a diagram schematically illustrating another structure of the flow rate control valve.
Figure 7:
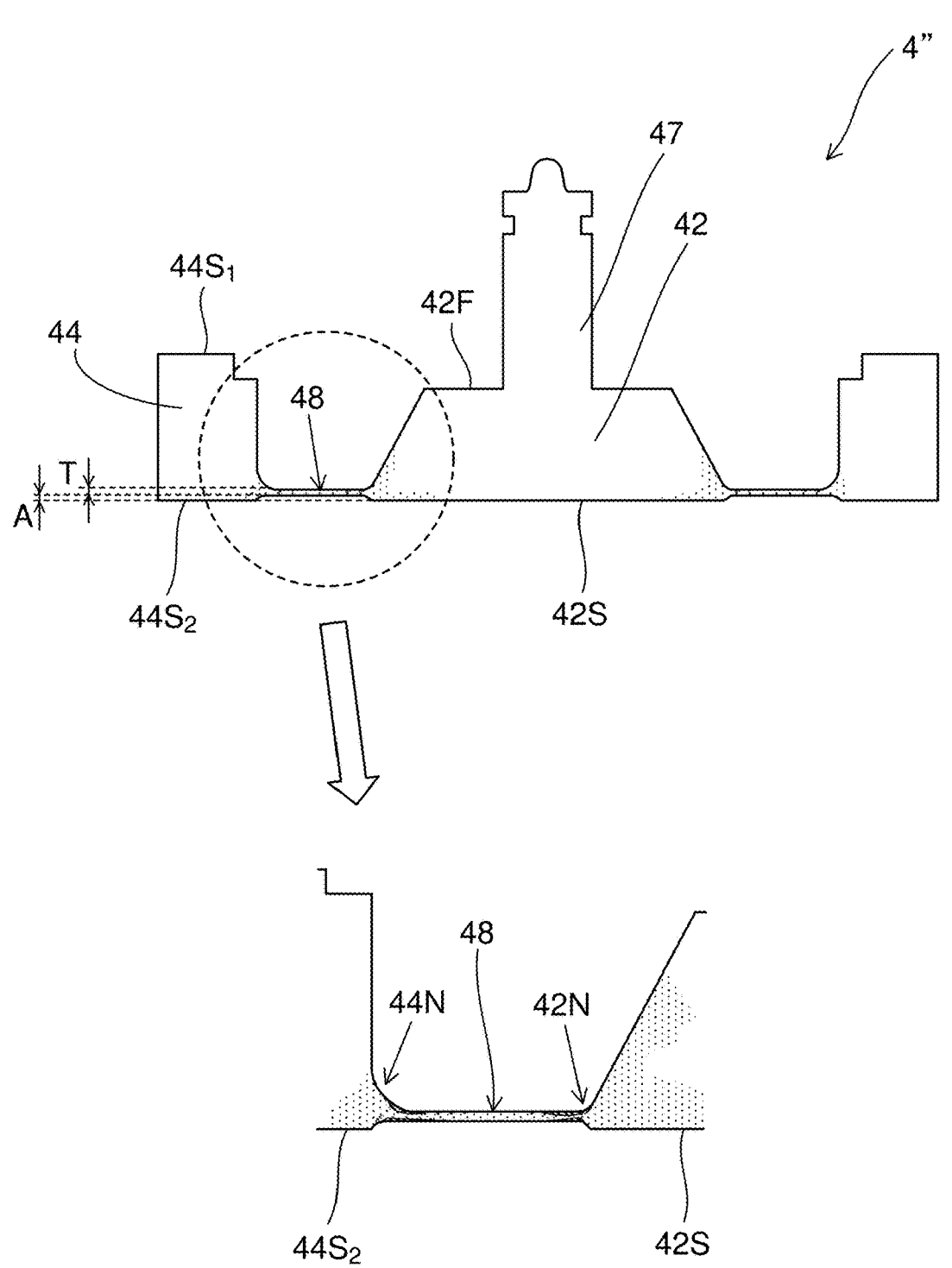
FIG. 7 is a diagram schematically illustrating the stress distribution when a voltage is applied to an actuator in a flow rate control valve designed so as to meet the condition that A<4T.

The condition that A≥4T is applicable also to a configuration of the flow rate control valve 4 shown in FIG. 6 where, when the diaphragm portion 48 is in the undeformed state, the opposite face 42F of the valve member 42 and the first face 44S$_1$ of the support member 44 are displaced in the contact/separate direction described above (a configuration where they are not positioned on the same plane). In this way, satisfying A≥4T also helps improve the sealing between the seat face 42S and the valve seat face 41S. The reason is as follows:

FIG. 7 schematically shows the stress distribution when a voltage is applied to the actuator 43 (see FIG. 1) in a flow rate control valve 4″ designed so as to meet the condition that A<4T (regions receiving stress are hatched). When a voltage is applied to the actuator 43 (see FIG. 1) and the valve member 42 begins to move in the second direction (a direction in which the seat face 42S approaches the valve seat face 41S), the diaphragm portion 48 is pulled by the valve member 42 and deformed. Thus, stress is generated in the diaphragm portion 48 as well as in connecting portions 42N and 44N. The connecting portion 42N is the connecting portion between the diaphragm portion 48 and the valve member 42, and the connecting portion 44N is the connection portion between the diaphragm portion 48 and the support member 44.

When A<4T, the connecting portion 42N is close to the seat face 42S, and this makes easier for the stress generated in the diaphragm portion 48 and the connecting portion 42N to be transmitted to the seat face 42S. As a result, the seat face 42S is distorted due to the stress described above. That is, the degree of flatness of the seat face 42S lowers. Thus, when the seat face 42S seats on the valve seat face 41S, ensuring the sealing performance between them is difficult, and a fluid leak is more likely to occur between them.

Figure 8:
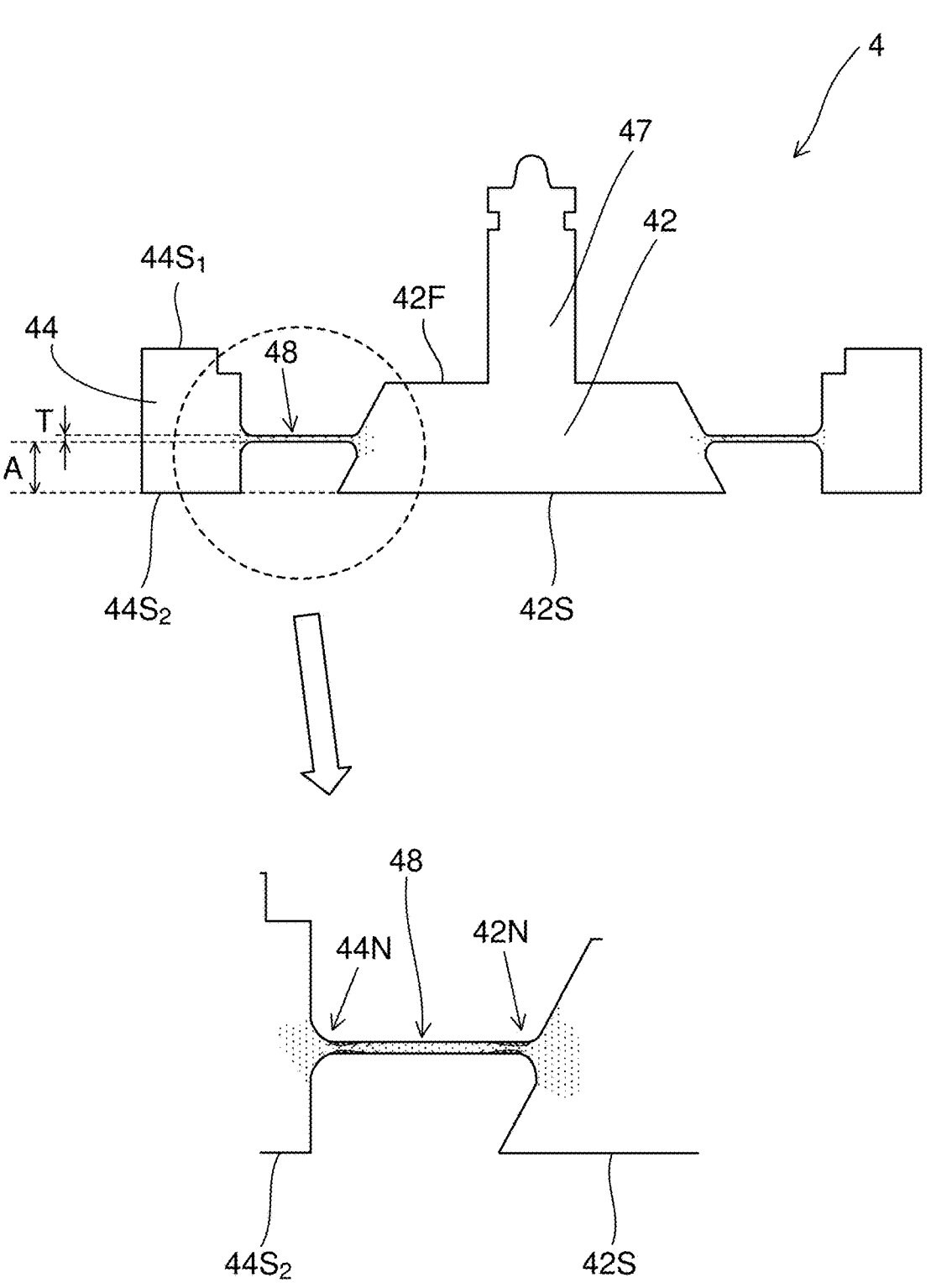
FIG. 8 is a diagram schematically illustrating the stress distribution when a voltage is applied to an actuator in a flow rate control valve designed so as to meet A≥4T.

FIG. 8 schematically shows the stress distribution when a voltage is applied to the actuator 43 in the flow rate control valve 4 designed so as to meet A≥4T. When A≥4T, the diaphragm portion 48 is sufficiently separated from the seat face 42S in the contact/separate direction, and this makes it difficult for the stress generated in the diaphragm portion 48 and the connecting portion 42N to be transmitted to the seat face 42S. This is clear from FIG. 8 in which the hatching indicating stress generated at the connecting portion 42N does not extend to the seat face 42S. Thus, it is possible to reduce the distortion of the seat face 42S caused by the stress described above and to secure the flatness of the seat face 42S. Thus, it is possible to improve the sealing performance between the seat face 42S and the valve seat face 41S when the seat face 42S seats on the valve seat face 41S, and thereby to reduce a fluid leak between the seat face 42S and the valve seat face 41S.

Here, the magnitude and transmission of stress from the connecting portion 42N to the seat face 42S vary depending on factors such as the material and the mechanical property of the valve member 42, the support member 44, the diaphragm portion 48, and the size (area of the membrane face 48a) of the diaphragm portion 48. However, even with these factors considered, structural analysis results have shown that, when A≥4T, it is possible to reduce the distortion of the seat face 42S caused by the stress, and to secure the flatness of the seat face 42S.

The diaphragm portion 48 may be positioned at a distance equal to or of more than 4T (toward the seat face 42S) away from the opposite face 42F in the contact/separate direction described above. That is, the diaphragm portion 48 may be positioned within a range between a position 4T away from the seat face 42S (toward the opposite face 42F) and a position 4T away from the opposite face 42F (toward the seat face 42S).

Figure 9:
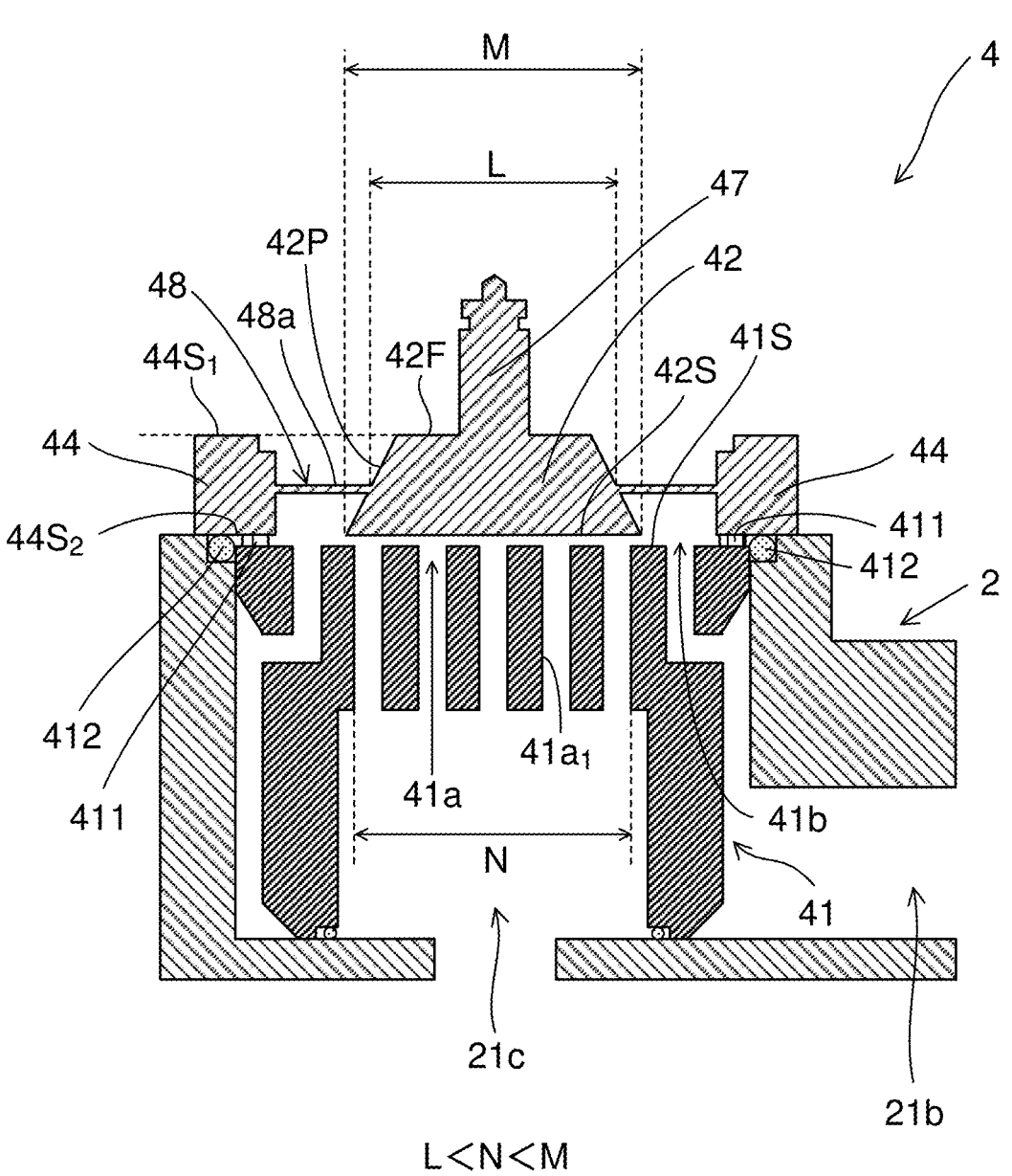
FIG. 9 is a diagram schematically illustrating the relationship among the inner diameter L of the diaphragm portion, the outer diameter M of the seat face, and the valve seat diameter N of a valve seat portion.

4. Relationship Between the Inner Diameter of the Diaphragm Portion and the Diameter of the Valve Seat FIG. 9 schematically shows the relationship, in the flow rate control valve 4 of the present embodiment, among the inner diameter L (mm) of the annular diaphragm portion 48, the outer diameter M (mm) of the seat face 42S of the valve member 42, and the valve seat diameter N (mm) of the valve seat portion 41. Here, the valve seat diameter N is defined as described below.

Figure 10:
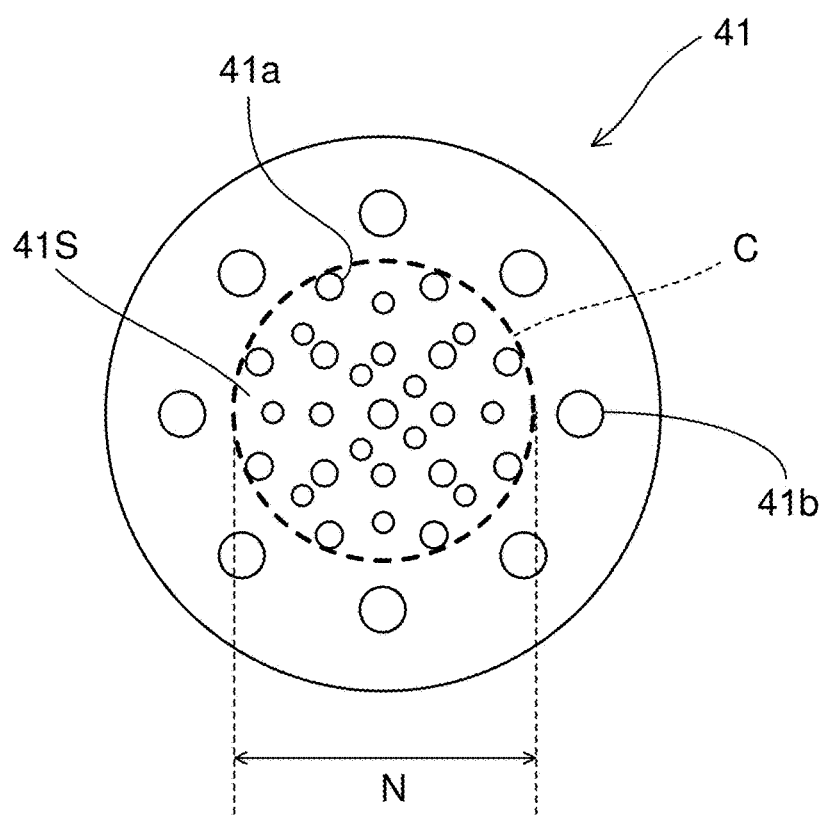
FIG. 10 is a plan view of the valve seat portion.

FIG. 10 is a plan view of the valve seat portion 41. The valve seat diameter N (orifice diameter) is defined as the minimum diameter of a circle C, described on the valve seat face 41S of the valve seat portion 41, that covers at least one opening that is sealed when the seat face 42S seats on the valve seat face 41S. Here, the opening refers to, of the first opening 41a and the second opening 41b in the valve seat face 41S, the first opening 41a that communicates with the intermediate flow passage 21c (see FIG. 9), which is an inlet side flow passage for a fluid. Thus, when, as in this embodiment, a plurality of first openings 41a are formed in the valve seat face 41S, the valve seat diameter N is equal to the minimum diameter of the circle C that covers the plurality of first openings 41a. On the other hand, if only one first opening 41a is formed in the valve seat face 41S, the valve seat diameter N is equal to the minimum diameter of the circle C that covers the single first opening 41a, that is, the diameter of the circle described by the first opening 41a.

In this embodiment, as shown in FIG. 9, the outer diameter M of the seat face 42S of the valve member 42 is larger than the inner diameter L of the diaphragm 48 (M>L). Thus, assuming that the inner diameter L is constant, it is possible to make the valve seat diameter N larger than the inner diameter L (N>L). In other words, the valve seat diameter N can be set to a value larger than the inner diameter L of the diaphragm 48 but smaller than the outer diameter M of the seat face 42S (so as to achieve the relationship that L<N<M). The thus increased valve seat diameter N helps improve the sealing performance between the seat face 42S and the valve seat face 41S. The reason will be described in detail below.

The condition that M>L is applicable also to the configuration of the flow rate control valve 4 in FIG. 6 where, when the diaphragm 48 is in an undeformed state, the opposite face 42F and the first face $44S_1$ are displaced from each other in the contact/separate direction.

With the increased valve seat diameter N owing to M>L, it is possible to produce, with a small displacement of the valve member 42 in the contact/separate direction, a predetermined flow rate for the fluid flowing through the first opening 41a. That is, for a given displacement of the valve member 42 in the contact/separate direction, it is possible to produce an increased flow rate of the fluid flowing through the first opening 41a of the valve seat face 41S. In this way, even if, for example, the temperature of the fluid rises, it is possible to keep a closing start voltage at a fixed value. Here, the closing start voltage refers to the voltage that needs to be applied to the actuator 43 to have the seat face 42S seat on the valve seat face 41S to reduce the flow rate of the fluid flowing through the first opening 41a in the valve seat face 41S to zero (or close to zero).

Figure 11:
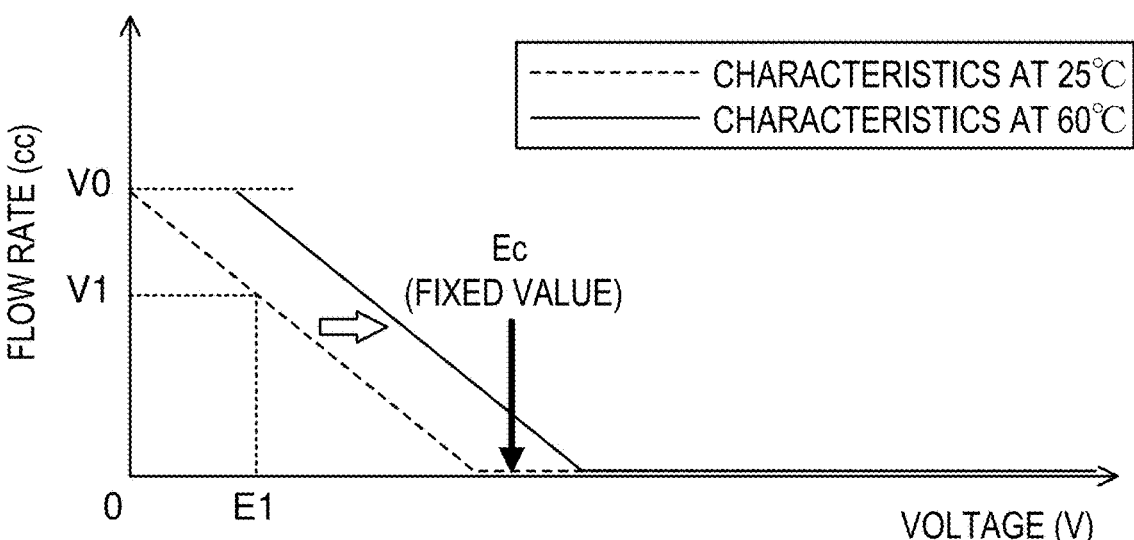
FIG. 11 is a graph schematically showing the normal relationship between the application voltage to the actuator and the flow rate of a fluid.

FIG. 11 is a graph schematically showing the relationship between the application voltage to the actuator 43 and the flow rate of a fluid flowing through the first opening 41a. Here, suppose that, when the application voltage to the actuator 43 is 0 V (maximum valve opening degree), a fluid flows through the first opening 41a at a flow rate V0 (cc). The closing start voltage Ec is, from the perspective of preventing damage to the actuator 43 (in particular, to the piezoelectric element), set to a voltage (for example, 90 V) lower than the maximum voltage that can be applied to the actuator 43.

Suppose that, at normal temperature (for example, 25° C.), the relationship between the voltage and the flow rate has the characteristics indicated by a broken line in FIG. 11. As the temperature of the fluid rises (for example, to 60° C.), the characteristics indicated by the broken line as a whole shifts to those indicated by a solid line. The characteristics indicated by the solid line indicate that, even when the closing start voltage Ec is applied, the fluid is still flowing. This is because thermal expansion caused by the rise in the fluid temperature makes the piezoelectric element contract and the metal housing 432 expand, and thus, even when the closing start voltage Ec, which is a fixed voltage, is applied, a gap is formed between the seat face 42S and the valve seat face 41S. In this case, to reduce the fluid flow rate to zero, the closing start voltage Ec needs to be increased to a higher voltage.

Figure 12:
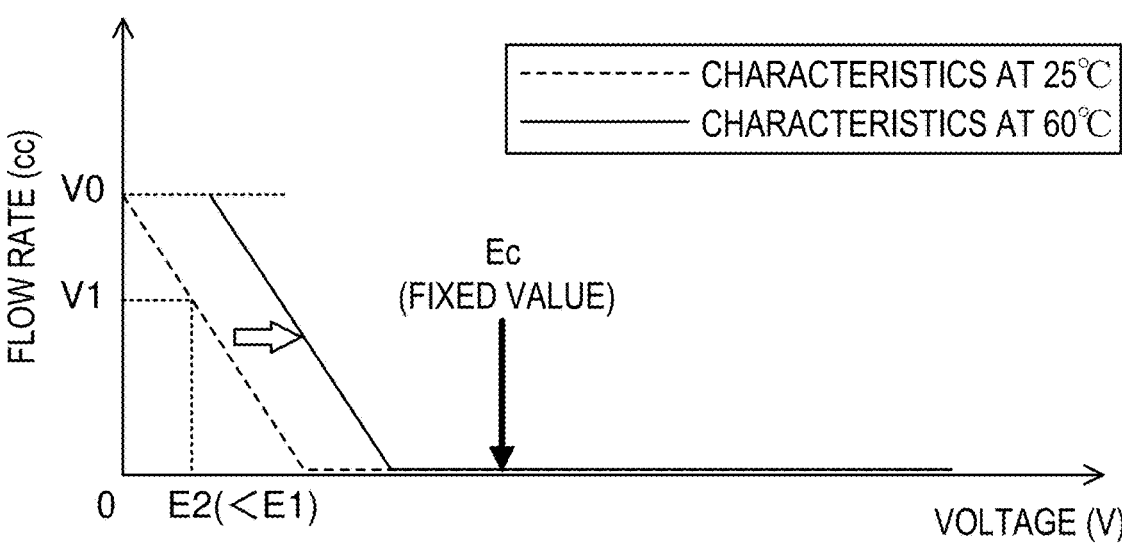
FIG. 12 is a graph schematically showing the relationship between the application voltage to the actuator and the flow rate of a fluid when the relationship that L<N is met.

In this embodiment, increasing the valve seat diameter N according to M>L and thereby increasing the flow rate of the fluid flowing through the first opening 41*a* of the valve seat face 41S makes it possible to change the characteristics shown in FIG. 11 to those shown in FIG. 12. FIG. 12 is a graph schematically showing the relationship between the application voltage to the actuator 43 and the flow rate of the fluid flowing through the first opening 41*a* as observed with the valve seat diameter N increased according to M>L.

With an increase in the flow rate of the fluid resulting from an increase in the valve seat diameter N, the characteristics representing the relationship between the voltage and the flow rate at normal temperature (e.g., 25° C.) can be changed to those indicated by a broken line in FIG. 12. That is, in the characteristics in FIG. 11, assuming that the application voltage to the actuator 43 that is needed to achieve a flow rate V1 is E1 (V), then, in the characteristics shown in FIG. 12, the application voltage to the actuator 43 that is needed to achieve the same flow rate V1 can be reduced to E2 (V) that is smaller than E1. As a result, even if the temperature of the fluid rises (e.g., to 60° C.) to cause the characteristics as a whole to shift from those indicated by the broken line to those indicated by the solid line, by applying the closing start voltage Ec, it is still possible to bring the flow rate close to zero. That is, it is possible to reduce the flow rate close to zero without increasing the closing start voltage Ec to a higher voltage.

In this way, increasing the valve seat diameter N permits, even when the fluid temperature rises, the seat face 42S of the valve member 42 to seat on the valve seat face 41S to close the first opening 41*a* (to reduce the flow rate to close to zero) without increasing the closing start voltage Ec. Thus, even when the fluid temperature rises, by applying the closing start voltage Ec, it is possible to reduce a fluid leak between the seat face 42S and the valve seat face 41S, and to improve the sealing performance between them.

Conventionally, as shown in FIG. 7, it is necessary to make the connecting portions 42N and 44N thick to ensure the strength of the connecting portion 42N between the diaphragm portion 48 and the valve member 42 as well as the connecting portion 44N between the diaphragm portion 48 and the support member 44. As shown in FIG. 9, displacing the diaphragm portion 48 from the seat face 42S in the first direction makes it possible to easily achieve a structure such that M>L, and to obtain the effects described above.

Owing to the relationship that N<M, when a voltage is applied to the actuator 43 and the seat face 42S of the valve member 42 seats on the valve seat face 41S, all the first openings 41*a* formed in the valve seat face 41S can be closed by the seat face 42S. Thus, the fluid flow rate can be brought to close to zero (or ultimately to zero).

Incorporating the flow rate control valve 4 of the embodiment described above in the flow rate control apparatus 1 (see FIG. 1) results in the flow rate control apparatus 1 offering improved sealing performance between the valve seat face 41S and the seat face 42S.

5. Others

While the above embodiment deals with a flow rate control valve 4 of a normally open type, the features and conditions of this embodiment are also applicable to a flow rate control valve of a normally closed type.

Needless to say, it is also possible to combine the features and conditions described in connection with this embodiment to construct the flow rate control valve 4. For example, the flow rate control valve 4 may of course be constructed by combining at least two of the following configurations: (1) a configuration where, as shown in FIG. 2, when the diaphragm portion 48 is in an undeformed state, the opposite face 42F and the first face 44S$_1$ are positioned on the same plane, or the height H1 of the valve member 42 and the height H2 of the support member 44 are equal to each other, (2) a configuration where, as shown in FIG. 5, the diaphragm portion 48 is positioned at least 4T away from the seat face 42S in the contact/separate direction, and (3) a configuration where, as shown in FIG. 9, the outer diameter M of the seat face 42S is larger than the inner diameter L of the diaphragm portion 48.

The configuration of the flow rate control valve 4 described in this embodiment can be applied not only to flow rate control apparatuses 1 that control fluid flow rates but also to pressure control devices that control fluid pressure.

The description of embodiments of the present invention given above is in no way meant to limit the invention, and various modifications are possible without departing from the spirit of the present invention.

INDUSTRIAL APPLICABILITY

The present invention finds applications in flow rate control apparatuses such as mass flow controllers.

REFERENCE CHARACTERS LIST

1 flow rate control apparatus
3 flow rate sensing mechanism
4 flow rate control valve
5 driving control portion
21*c* intermediate flow passage (inlet side flow passage)
41 valve seat portion
41*a* first opening
41S valve seat face
42 valve member
42F opposite face
42P circumferential face
42S seat face
43 actuator (driving portion)
44 support member
44S$_1$ first face
44S$_2$ second face
48 diaphragm portion
48*a* membrane face
60 flat face
61 lapping surface plate
62 polishing material

The invention claimed is:

1. A flow rate control valve comprising:

a valve seat portion having a valve seat face;

a valve member having a seat face that makes contact with and separates from the valve seat face;

an actuator that drives the valve member in a contact/separate direction in which the seat face makes contact with and separates from the valve seat face;

a plunger connected to the valve member at an opposite face of the valve member toward the actuator, wherein a diameter of the plunger is smaller than a diameter of the opposite face; and a support member that supports the valve member via a diaphragm portion, wherein the valve member further has the opposite face that is positioned opposite from the valve seat face with respect to the seat face and a circumferential face that connects together the seat face and the opposite face, the diaphragm portion is connected to the circumferential face of the valve member at a position between the opposite face and the seat face, the diaphragm portion is connected to the circumferential face of the valve member at a position closer to the seat face than to the opposite face, the support member has a first face that is positioned on a same side as the opposite face with respect to a position of a membrane face of the diaphragm portion and a second face that is positioned closer to the valve seat portion than the first face, and when the diaphragm portion is in an undeformed state, the opposite face and the first face are positioned on a same plane.

2. The flow rate control valve according to claim 1, wherein a height of the valve member, which is defined as a distance between the opposite face and the seat face, is equal to a height of the support member, which is defined as a distance between the first face and the second face.

3. The flow rate control valve according to claim 1, wherein the seat face of the valve member is positioned opposite from the opposite face with respect to the position of the membrane face of the diaphragm portion, and the second face of the support member is positioned opposite from the first face with respect to the position of the membrane face of the diaphragm portion.

4. The flow rate control valve according to claim 1, wherein when a thickness of the diaphragm portion in the contact/separate direction is T, the diaphragm portion is positioned at least 4T away from the seat face in the contact/separate direction.

5. The flow rate control valve according to claim 1, wherein an outer diameter of the seat face is larger than an inner diameter of the diaphragm portion.

6. The flow rate control valve according to claim 5, wherein the valve seat face has at least one opening that is closed when the seat face seats on the valve seat face, the at least one opening communicates with an inlet side flow passage for a fluid, and when, on the valve seat face, a minimum diameter of a circle that covers the at least one opening is defined as a valve seat diameter, the valve seat diameter is smaller than the outer diameter of the seat face but is larger than the inner diameter of the diaphragm portion.

7. A method of manufacturing the flow rate control valve according to claim 1, the method comprising a polishing process of polishing the seat face by pressing the seat face of the valve member against a lapping surface plate with a polishing material in between, wherein in the polishing process, the seat face is polished with the opposite face of the valve member and the first face of the support member simultaneously pressed with a same flat face against the lapping surface plate.

8. A flow rate control apparatus comprising:

the flow rate control valve according to claim 1;

a flow rate sensing mechanism that senses a flow rate of a fluid; and a driving control portion that drives the actuator of the flow rate control valve based on a sensing result from the flow rate sensing mechanism.

9. A flow rate control valve comprising:

a valve seat portion having a valve seat face;

a valve member having a seat face that makes contact with and separates from the valve seat face;

an actuator that drives the valve member in a contact/separate direction in which the seat face makes contact with and separates from the valve seat face;

a plunger connected to the valve member at an opposite face of the valve member toward the actuator, wherein a diameter of the plunger is smaller than a diameter of the opposite face; and a support member that supports the valve member via a diaphragm portion, wherein the valve member further has the opposite face that is positioned opposite from the valve seat face with respect to the seat face and a circumferential face that connects together the seat face and the opposite face, the diaphragm portion is connected to the circumferential face of the valve member at a position between the opposite face and the seat face, the diaphragm portion is connected to the circumferential face of the valve member at a position closer to the seat face than to the opposite face, the support member has a first face that is positioned on a same side as the opposite face with respect to a position of a membrane face of the diaphragm portion and a second face that is positioned closer to the valve seat portion than the first face, and a height of the valve member, which is defined as a distance between the opposite face and the seat face, is equal to a height of the support member, which is defined as a distance between the first face and the second face.

10. The flow rate control valve according to claim 9, wherein the seat face of the valve member is positioned opposite from the opposite face with respect to the position of the membrane face of the diaphragm portion, and the second face of the support member is positioned opposite from the first face with respect to the position of the membrane face of the diaphragm portion.

11. The flow rate control valve according to claim 9, wherein when a thickness of the diaphragm portion in the contact/separate direction is T, the diaphragm portion is positioned at least 4T away from the seat face in the contact/separate direction.

12. The flow rate control valve according to claim 9, wherein an outer diameter of the seat face is larger than an inner diameter of the diaphragm portion.

13. The flow rate control valve according to claim 12, wherein the valve seat face has at least one opening that is closed when the seat face seats on the valve seat face, the at least one opening communicates with an inlet side flow passage for a fluid, and when, on the valve seat face, a minimum diameter of a circle that covers the at least one opening is defined as a valve seat diameter, the valve seat diameter is smaller than the outer diameter of the seat face but is larger than the inner diameter of the diaphragm portion.

14. A method of manufacturing the flow rate control valve according to claim 9, the method comprising a polishing process of polishing the seat face by pressing the seat face of the valve member against a lapping surface plate with a polishing material in between, wherein in the polishing process, the seat face is polished with the opposite face of the valve member and the first face of the support member simultaneously pressed with a same flat face against the lapping surface plate.

15. A flow rate control valve comprising:

a valve seat portion having a valve seat face;

a valve member having a seat face that makes contact with and separates from the valve seat face, wherein the valve member comprises a substantially truncated cone-shape;

an actuator that drives the valve member in a contact/separate direction in which the seat face makes contact with and separates from the valve seat face; and a support member that supports the valve member via a diaphragm portion, wherein the valve member further has an opposite face that is positioned opposite from the valve seat face with respect to the seat face and a circumferential face that connects together the seat face and the opposite face, the diaphragm portion is connected to the circumferential face of the valve member at a position between the opposite face and the seat face, the support member has a first face that is positioned on a same side as the opposite face with respect to a position of a membrane face of the diaphragm portion and a second face that is positioned opposite from the first face with respect to the position of the membrane face of the diaphragm portion, and when a thickness of the diaphragm portion in the contact/separate direction is T, the diaphragm portion is positioned at least 4T away from the seat face in the contact/separate direction.

16. The flow rate control valve according to claim 15, wherein an outer diameter of the seat face is larger than an inner diameter of the diaphragm portion.

17. The flow rate control valve according to claim 15, wherein the valve seat face has at least one opening that is closed when the seat face seats on the valve seat face, the at least one opening communicates with an inlet side flow passage for a fluid, and when, on the valve seat face, a minimum diameter of a circle that covers the at least one opening is defined as a valve seat diameter, the valve seat diameter is smaller than the outer diameter of the seat face but is larger than the inner diameter of the diaphragm portion.

18. A flow rate control valve comprising:

a valve seat portion having a valve seat face;

a valve member having a seat face that makes contact with and separates from the valve seat face, wherein the seat face closes a plurality of first openings defined by the valve seat portion when the seat face seats on the valve seat face;

an actuator that drives the valve member in a contact/separate direction in which the seat face makes contact with and separates from the valve seat face; and a support member that supports the valve member via a diaphragm portion, wherein the valve member further has an opposite face that is positioned opposite from the valve seat face with respect to the seat face and a circumferential face that connects together the seat face and the opposite face, the diaphragm portion is connected to the circumferential face of the valve member at a position between the opposite face and the seat face, the support member has a first face that is positioned on a same side as the opposite face with respect to a position of a membrane face of the diaphragm portion and a second face that is positioned opposite from the first face with respect to the position of the membrane face of the diaphragm portion, and an outer diameter of the seat face is larger than an inner diameter of the diaphragm portion.

19. The flow rate control valve according to claim 18, wherein the valve seat face has at least one opening that is closed when the seat face seats on the valve seat face, the at least one opening communicates with an inlet side flow passage for a fluid, and when, on the valve seat face, a minimum diameter of a circle that covers the at least one opening is defined as a valve seat diameter, the valve seat diameter is smaller than the outer diameter of the seat face but is larger than the inner diameter of the diaphragm portion.

20. The flow rate control valve according to claim 18, wherein the valve seat portion further defines a second opening that remains open when the seat face seats the valve seat face.

21. The flow rate control valve according to claim 20, wherein the second opening is disposed radially outward of the plurality of first openings, and wherein the outer diameter of the seat face of the valve member is located between the plurality of first openings and the second opening.

* * * * *